United States Patent [19]

Olexson

[11] Patent Number: 5,779,827
[45] Date of Patent: Jul. 14, 1998

[54] TIRE TRACTION APPARATUS

[76] Inventor: Steven Olexson, 3670 N. Delaware Dr., Easton, Pa. 18040

[21] Appl. No.: 496,580

[22] Filed: Jun. 29, 1995

[51] Int. Cl.$^6$ .................................................. B60C 27/20
[52] U.S. Cl. ........................ 152/217; 152/218; 152/225 C
[58] Field of Search ............................. 152/213 R, 216, 152/217, 218, 225 C, 225 R

[56] References Cited

U.S. PATENT DOCUMENTS

| | | | |
|---|---|---|---|
| 2,456,544 | 12/1948 | Varner | 152/225 R |
| 2,477,051 | 7/1949 | Eisenhauer | 152/225 R |
| 2,510,451 | 6/1950 | Williams et al. | 152/225 R |
| 2,575,263 | 11/1951 | Eisenhauer | 152/217 |
| 2,581,578 | 1/1952 | Cruse | 152/217 |
| 2,586,049 | 2/1952 | Jacobs | 152/217 |
| 2,596,517 | 5/1952 | Allen | 152/217 |
| 2,640,522 | 6/1953 | Schroen | 152/217 |
| 3,063,489 | 11/1962 | Blumkin | 152/213 R |
| 3,245,451 | 4/1966 | Gellman | 152/225 C |
| 3,283,796 | 11/1966 | White et al. | 152/218 |
| 3,490,511 | 1/1970 | Muller et al. | |
| 3,565,150 | 2/1971 | Carr | 152/218 |
| 3,566,949 | 3/1971 | Schieber | |
| 3,735,789 | 5/1973 | Landerer et al. | 152/217 |
| 3,762,457 | 10/1973 | Guethle | |
| 4,066,112 | 1/1978 | Goldstein | |
| 4,730,655 | 3/1988 | Yang | |
| 4,862,937 | 9/1989 | Nakajima | 152/218 |
| 5,318,087 | 6/1994 | Gun | |

FOREIGN PATENT DOCUMENTS

| | | | |
|---|---|---|---|
| 112611 | 7/1984 | European Pat. Off. | 152/225 C |
| 2373407 | 8/1978 | France | 152/225 C |
| 2498530 | 7/1982 | France | 152/225 C |
| 2626219 | 7/1989 | France | 152/225 C |
| 2262011 | 6/1973 | Germany | 152/225 R |
| 1939480 | 9/1978 | Germany | 152/225 C |
| 570884 | 12/1975 | Switzerland | 152/225 R |

*Primary Examiner*—Steven D. Maki

[57] ABSTRACT

A tire traction improvement apparatus is provided for installation on a wheel-mounted vehicle tire and includes a base assembly which includes a base plate. A fulcrum post projects from the base plate a predetermined distance from the base plate. A pair of first tire-gripper assemblies are attached to the base assembly and are oriented with respect to each other on the base assembly at a predetermined orientation angle. Each of the first tire-gripper assemblies includes a first tread-gripper portion. A guide element receives a radially adjustable second tire-gripper assembly which includes an adjustable extension portion which has a proximal end and a distal end. The adjustable extension portion includes a plurality of adjustment apertures arrayed between the proximal end and the distal end. The proximal end of the adjustable extension portion is received by the guide element of the base assembly. The second tire-gripper assembly includes a second tread-gripper portion. A tensioning assembly, supported by the fulcrum post of the base assembly, pulls the second tread-gripper portion of the second tire-gripper assembly toward the tire, whereby the pair of first tread-gripper portions of the first tire-gripper assemblies and the second tread-gripper portion of the second tire-gripper assembly exert a clamping pressure on the tread surface of the tire. A locking assembly locks the tensioning assembly in a selected degree of tension on the tread surface of the tire.

2 Claims, 4 Drawing Sheets

FIG 5

TIRE TRACTION APPARATUS

BACKGROUND OF THE INVENTION

1. Field of the Invention

The present invention relates generally to devices for improving tire traction on a road surface and, more particularly, to devices especially adapted for temporary installation on a tire for improvement in traction during snowy and icy road conditions.

2. Description of the Prior Art

Under most weather conditions, the traction between a vehicle tire and the road surface is adequate as long as the tire has sufficient tread. However, during certain weather conditions, such as when snow and ice are on the road surface, even a tire having a normal tread surface may not have sufficient traction on the road surface. During such conditions, tire chains are often installed on the tires.

Throughout the years, a number of innovations have been developed relating to tire chains, and the following U.S. patents are representative of some of those innovations: U.S. Pat. Nos. 3,490,511; 3,566,949; 3,762,457; 4,066,112; 4,730,655; and 5,318,087. Although the above-cited patents disclose many variations, the underlying theme is the same. Complex chain structures are disclosed in each patent. Generally, complex chain structures are noisy as the vehicle proceeds down the roadway. Moreover, a number of the above-cited patents disclose rather complex arrangements for supporting the chains on the tires. A number of the patents require two circular support structures that are placed on each tire, one on each side of the tire, to support chain elements that traverse the tire tread. To avoid the above-mentioned complexities, it would be desirable if a device were provided for improving tire traction with a road surface which does not require the use of tire chains. In addition, it would be desirable if a device were provided for improving tire traction with a road surface which does not employ circular support structures placed on each side of a tire.

Most tire chain devices require a three-step installation process. In one step, the portion of the tire tread that is not contacting the road surface is affixed with chains. The portion of the tire tread that is contacting the road surface is ignored in the first step. Then, the vehicle is moved to expose the portion of the tire tread that was previously in contact with the road surface. Finally, chains are affixed to the tire to traverse the tread surface that was previously not traversed with chains. One requirement of the above-described installation procedure that may be most distressful is the requirement for moving the vehicle during the installation procedure. To avoid such complexities of installation, to avoid the time and effort required for such installation procedures, and to avoid the need for moving the vehicle during the installation procedure, it would be desirable if a device were provided for improving tire traction with a road surface that can be installed on a tire with a simple installation procedure that does not require moving the vehicle during the installation procedure.

When conventional tire chains are installed on tires, a problem that must be overcome is providing a tight fit on the tires. If the fit is too loose, the chains may swing up and damage the underside of a fender. Therefore, it would be desirable if a device were provided for improving tire traction with a road surface that has a mechanism for assuring a tight fit of the device on the tire.

Once a tight fit is obtained, it would be desirable for the tire traction improvement device to have a mechanism for maintaining the device on the tire with a tight fit. Furthermore, the degree of tightness of fit of the tire traction improvement device on a tire depends on a number of factors which include the roughness of the road and the speed of travel. In this respect, it would be desirable if a device were provided for improving tire traction with a road surface that includes a mechanism for varying the degree of tightness of fit of the device on a tire.

Thus far, only tire chains have been discussed for improving traction between a tire and a road surface. However, still other devices are known for improving traction. For example, studs on tires are used for improving traction. However, such studs are generally implanted into the body of a tire. Therefore, such studs may cause damage to normal road surfaces when snow and ice are no longer present on the road surface. However, to gain the benefits of studs when they are needed, and to be able to readily remove the studs when they are not needed, it would be desirable if a device were provided for improving tire traction with a road surface that is easily removed from a tire and that optionally included studs.

Tires come in a wide range of sizes that include a range of tire widths and a range of tire diameters. However, for a specific tire width, it would be desirable if a device were provided for improving tire traction with a road surface that is adjustable for a range of tire diameters.

Thus, while the foregoing body of prior art indicates it to be well known to use devices to improve traction between a tire and a road surface, the prior art described above does not teach or suggest a tire traction improvement apparatus which has the following combination of desirable features: (1) does not require the use of tire chains; (2) does not employ circular support structures placed on each side of a tire; (3) does not require moving a vehicle during the installation procedure; (4) has a mechanism for assuring a tight fit of the device on the tire; (5) has a mechanism for maintaining the device on the tire with a tight fit; (6) is easily removed from a tire and that optionally includes studs; (7) includes a mechanism for varying the degree of tightness of fit of the device on a tire; and (8) is adjustable for a range of tire diameters. The foregoing desired characteristics are provided by the unique tire traction improvement apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a tire traction improvement apparatus for installation on a wheel-mounted vehicle tire and includes a base assembly which includes a base plate. A fulcrum post projects from the base plate a predetermined distance from the base plate. First attachment means, such as metal welds, attach a pair of first tire-gripper assemblies to the base assembly. A guide element receives a radially adjustable second tire-gripper assembly. A pair of first tire-gripper assemblies are attached to the base assembly and are oriented with respect to each other on the base assembly at a predetermined orientation angle.

Each of the first tire-gripper assemblies includes an extension portion which has a proximal end and a distal end. The proximal end is connected to the base assembly. The extension portion extends radially from the base assembly. Each of the first tire-gripper assemblies includes a first tread-gripper portion connected to the distal end of the extension portion.

A second tire-gripper assembly includes an adjustable extension portion which has a proximal end and a distal end. The adjustable extension portion includes a plurality of adjustment elements, such as apertures, arrayed between the proximal end and the distal end. The proximal end of the adjustable extension portion is received by the guide element of the base assembly. The second tire-gripper assembly includes a second tread-gripper portion connected to the distal end of the adjustable extension portion.

A tensioning assembly, supported by the fulcrum post of the base assembly, pulls the second tread-gripper portion of the second tire-gripper assembly toward the tire, whereby the pair of first tread-gripper portions of the first tire-gripper assemblies and the second tread-gripper portion of the second tire-gripper assembly exert a clamping pressure on the tread surface of the tire.

A locking assembly locks the tensioning assembly in a selected degree of tension on the tread surface of the tire. The orientation angle is approximately one hundred twenty degrees. The guide element includes a guide channel for receiving the proximal end of the second tire-gripper assembly.

The tensioning assembly includes a handle which includes a proximal end and a distal end. The distal end of the handle is pivotally is connected to the fulcrum post by a first pivot pin. A tensioning arm includes a proximal end and a distal end. The proximal end of the tensioning arm is pivotally connected to the handle by a second pivot pin. The distal end of the tensioning arm is in engagement with a selected adjustment element on the adjustable extension portion of the second tire-gripper assembly.

The locking assembly includes an over-center-toggle mechanism. For the over-center-toggle mechanism, the handle includes a second aperture located distal to the first aperture, such that when the handle is in a locked position, the second aperture is a predetermined locking distance from the base plate of the base assembly. The locking distance is less than the predetermined distance so that the fulcrum post extends above the base plate. The handle has a handle end width which is less than the locking distance, whereby the end of the handle, the second aperture of the handle, and the first aperture of the handle form the over-center-toggle mechanism for locking the locking assembly.

The proximal end of the handle includes a first aperture. The fulcrum post includes a fulcrum aperture. The first pivot pin passes through the first aperture and the fulcrum aperture when the first aperture and the fulcrum aperture are placed in registration.

Locking studs may be connected to the first tire-gripper assemblies and the second tire-gripper assembly. The locking studs are position on the first tire-gripper assemblies and the second tire-gripper assembly such that the locking studs are on opposite sides of the tire, and chain segments is connected between the locking studs on the respective tire-gripper assemblies, such that the chain segments straddle the first tread-gripper portions and the second tread-gripper portion, respectively.

A plurality of stud assemblies may be connected to the first tread-gripper portion and the second tread-gripper portion.

The first tire-gripper assemblies and the second tire-gripper assembly may include hinge assemblies located between the first tread-gripper portions and the extension portions of the first tire-gripper assemblies and between the second tread-gripper portion and the adjustable extension portion of the second tire-gripper assembly, respectively.

Acute angle bends may be provided between the first tread-gripper portions and the extension portions of the first tire-gripper assemblies and between the second tread-gripper portion and the adjustable extension portion of the second tire-gripper assembly, respectively.

The outer surfaces of the first tread-gripper portions of the first tire-gripper assemblies and the second tread-gripper portion of the second tire-gripper assembly serve to improve traction between the tire and the road surface.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire traction improvement apparatus which has all of the advantages of the prior art and none of the disadvantages.

It is another object of the present invention to provide a new and improved tire traction improvement apparatus which may be easily and efficiently manufactured and marketed.

It is a further object of the present invention to provide a new and improved tire traction improvement apparatus which is of durable and reliable construction.

An even further object of the present invention is to provide a new and improved tire traction improvement apparatus which is susceptible of a low cost of manufacture with regard to both materials and labor, and which accordingly is then susceptible of low prices of sale to the consuming public, thereby making such tire traction improvement apparatus available to the buying public.

Still yet a further object of the present invention is to provide a new and improved tire traction improvement apparatus which does not require the use of tire chains.

Still another object of the present invention is to provide a new and improved tire traction improvement apparatus that does not employ circular support structures placed on each side of a tire.

Yet another object of the present invention is to provide a new and improved tire traction improvement apparatus which does not require moving a vehicle during the installation procedure.

Even another object of the present invention is to provide a new and improved tire traction improvement apparatus that has a mechanism for assuring a tight fit of the device on the tire.

Still a further object of the present invention is to provide a new and improved tire traction improvement apparatus which has a mechanism for maintaining the device on the tire with a tight fit.

Still another object of the present invention is to provide a new and improved tire traction improvement apparatus which includes a mechanism for varying the degree of tightness of fit of the device on a tire.

Yet another object of the present invention is to provide a new and improved tire traction improvement apparatus that is adjustable for a range of tire diameters.

Yet another object of the present invention is to provide a new and improved tire traction improvement apparatus that is easily removed from a tire and that optionally includes studs.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof Such description makes reference to the annexed drawing wherein.

DESCRIPTION OF THE PREFERRED EMBODIMENT

With reference to the drawings, a new and improved tire traction improvement apparatus embodying the principles and concepts of the present invention will be described.

Turning to FIGS. 1–5, there is shown an exemplary embodiment of the tire traction improvement apparatus of the invention generally designated by reference numeral 10. In its preferred form, tire traction improvement apparatus 10 is provided for installation on a wheel-mounted vehicle tire 12 and includes a base assembly 14 which includes a base plate 16. A fulcrum post 18 projects from the base plate 16 a predetermined distance 20 from the base plate 16. First attachment means 22 attach a pair of first tire-gripper assemblies 24 to the base assembly 14. The first attachment means 22 may be metal welds between the first tire-gripper assemblies 24 and the base assembly 14. A guide element 26 receives a radially adjustable second tire-gripper assembly 28. A pair of first tire-gripper assemblies 24 are attached to the base assembly 14 and are oriented with respect to each other on the base assembly 14 at a predetermined orientation angle 30.

Each of the first tire-gripper assemblies 24 includes an extension portion 32 which has a proximal end 34 and a distal end 36. The proximal end 34 is connected to the base assembly 14. The extension portion 32 extends radially from the base assembly 14. Each of the first tire-gripper assemblies 24 includes a first tread-gripper portion 38 connected to the distal end 36 of the extension portion 32.

A second tire-gripper assembly 28 includes an adjustable extension portion 42 which has a proximal end 44 and a distal end 46. The adjustable extension portion 42 includes a plurality of adjustment elements 48 arrayed between the proximal end 44 and the distal end 46. The proximal end 44 of the adjustable extension portion 42 is received by the guide element 26 of the base assembly 14. The second tire-gripper assembly 28 includes a second tread-gripper portion 50 connected to the distal end 46 of the adjustable extension portion 42.

A tensioning assembly 52, supported by the fulcrum post 18 of the base assembly 14, pulls the second tread-gripper portion 50 of the second tire-gripper assembly 28 toward the tire 12, whereby the pair of first tread-gripper portions 38 of the first tire-gripper assemblies 24 and the second tread-gripper portion 50 of the second tire-gripper assembly 28 exert a clamping pressure on the tread surface 54 of the tire 12.

A locking assembly 56 locks the tensioning assembly 52 in a selected degree of tension on the tread surface 54 of the tire 12. The orientation angle 30 is approximately one hundred twenty degrees. The guide element 26 includes a guide channel 26 for receiving the proximal end 44 of the second tire-gripper assembly 28.

The outer surfaces of the first tread-gripper portions 38 of the first tire-gripper assemblies 24 and the second tread-gripper portion 50 of the second tire-gripper assembly 28 serve to improve traction between the tire 12 and the road surface.

The tensioning assembly 52 includes a handle 58 which includes a proximal end 60 and a distal end 62. The distal end 62 of the handle 58 is pivotally is connected to the fulcrum post 18 by a first pivot pin 64. A tensioning arm 70 includes a proximal end 74 and a distal end 76. The proximal end 74 of the tensioning arm 70 is pivotally connected to the handle 58 by a second pivot pin 72. The distal end 76 of the tensioning arm 70 is in engagement with a selected adjustment element 48 on the adjustable extension portion 42 of the second tire-gripper assembly 28.

The adjustment elements 48 can be apertures 48. The first pivot pin 64 and the second pivot pin 72 can be threaded bolts which are secured to the handle 58 and the fulcrum post 18 by nuts 98, respectively. A spacer element 23 is positioned between the proximal end 74 of the tensioning arm 70 and the handle 58.

The locking assembly 56 includes an over-center-toggle mechanism. For the over-center-toggle mechanism, the handle 58 includes a second aperture 78 located distal to the first aperture 66, such that when the handle 58 is in a locked position, the second aperture 78 is a predetermined locking distance 82 from the base plate 16 of the base assembly 14. The locking distance 82 is less than the predetermined distance 20 so that the fulcrum post 18 extends above the base plate 16. The handle 58 has a handle end width 80 which is less than the locking distance 82, whereby the end of the handle 58, the second aperture 78 of the handle 58, and the first aperture 66 of the handle 58 form the over-center-toggle mechanism for locking the locking assembly 56.

The proximal end 60 of the handle 58 includes a first aperture 66. The fulcrum post 18 includes a fulcrum aperture 68. The first pivot pin 64 passes through the first aperture 66 and the fulcrum aperture 68 when the first aperture 66 and the fulcrum aperture 68 are placed in registration.

In using the tire traction improvement apparatus 10 of the invention, the proximal end 44 of the second tire-gripper assembly 28 is first placed with the guide channel 26. The handle 58 is swung around the fulcrum post 18 toward the second tire-gripper assembly 28. The tire traction improvement apparatus 10 is placed around the tread surface 54 of a tire 12. The distal end 76 of the tensioning arm 70 is placed in a selected apertures 48 of the second tire-gripper assembly 28. Then, the handle 58 is swung in the opposite direction, away from the second tire-gripper assembly 28. When this is done, the distal end 76 of the tensioning arm 70 pulls the second tread-gripper portion 50 of the second tire-gripper assembly 28 toward the base assembly 14.

After the distal end 76 of the tensioning arm 70 has been inserted into an appropriate aperture 48, as the handle 58 is swung away from the second tread-gripper portion 50 of the second tire-gripper assembly 28, the second tread-gripper portion 50 of the second tire-gripper assembly 28 and the first tread-gripper portions 38 of the first tire-gripper assemblies 24 all exert a clamping pressure on the tread surface 54 of the tire 12. As the handle 58 is swung further away from the second tread-gripper portion 50 of the second tire-gripper assembly 28, the proximal end 74 of the tensioning arm 70 is swung over and past the fulcrum post 18. The proximal end 74 of the tensioning arm 70 pivots around the second pivot pin 72, and as the proximal end 74 swings over the fulcrum post 18, the second pivot pin 72 also swings over the fulcrum post 18. This motion of the handle 58 further increases the tension exerted by the first tire-gripper assemblies 24 and the second tire-gripper assembly 28 on the tread surface 54 of the tire 12.

After the proximal end 74 of the tensioning arm 70 and the second pivot pin 72 pass by the fulcrum post 18, as the handle 58 is continually swung away from the second tread-gripper portion 50 of the second tire-gripper assembly 28, the second pivot pin 72 attains a position closer to the base plate 16 than the first pivot pin 64 on the fulcrum post 18. The handle position which provides this position of the second pivot pin 72 with respect to the first pivot pin 64 is the locking position for the handle 58.

In addition, the handle end width 80 is sufficiently small to permit the second pivot pin 72 to attain the position closer to the base plate 16 than the first pivot pin 64 on the fulcrum post 18 when the handle 58 is in the locking position. The locking position is an over-center-toggle position of the second pivot pin 72 with respect to the first pivot pin 64 and the point at which the tensioning arm 70 contacts the second tire-gripper assembly 28.

Although the locking assembly 56 disclosed in detail above is an over-center-toggle mechanism, the locking assembly 56 may also include a ratchet type clamp or a bolt type clamp.

The variations of the tire traction improvement apparatus 10 of the invention shown in FIGS. 6–13 serve to further enhance the improvement in traction between the tire 12 and the road surface.

Figure 1:
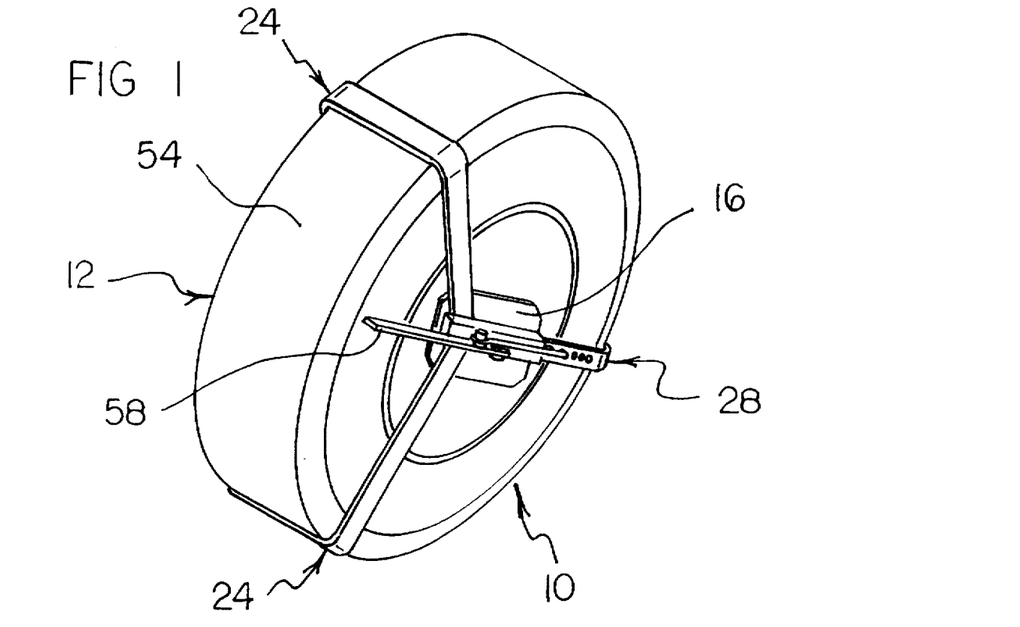
FIG. 1 is an outside perspective view of a tire showing a preferred embodiment of the tire traction improvement apparatus of the invention installed on the tire.
Figure 2:
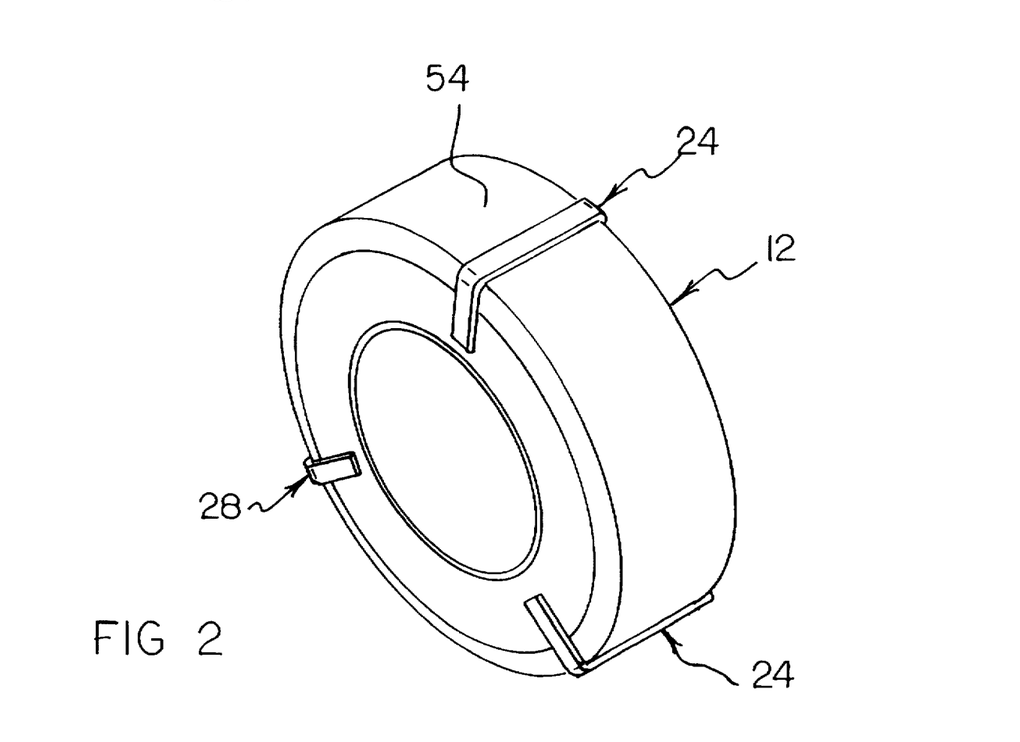
FIG. 2 is an inside perspective view of the tire in FIG. 1 with the embodiment of the tire traction improvement apparatus shown in FIG. 1 installed on the tire.
Figure 3:
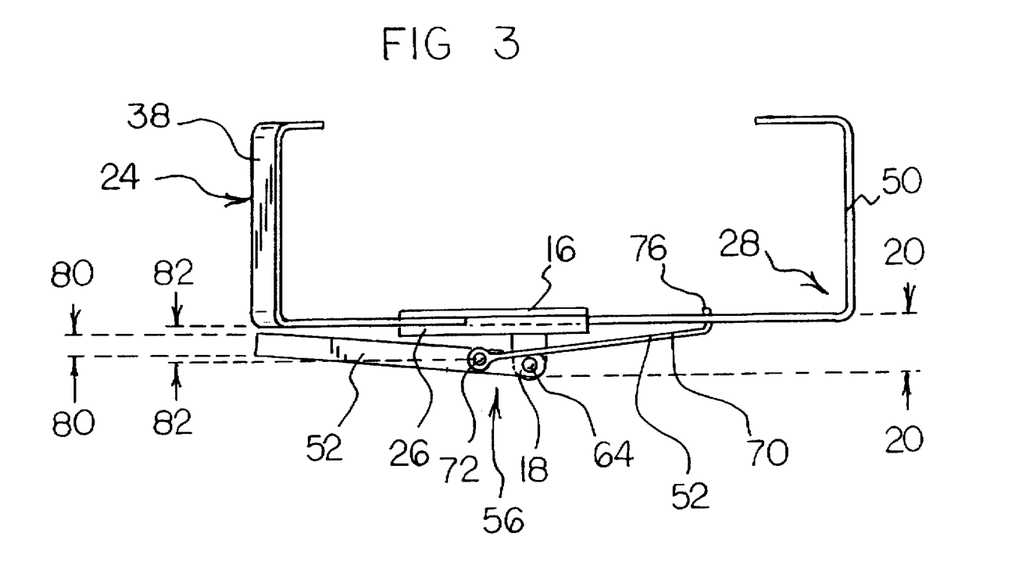
FIG. 3 is an enlarged top view of the embodiment of the tire traction improvement apparatus of FIGS. 1 and 2 removed from the tire.
Figure 4:
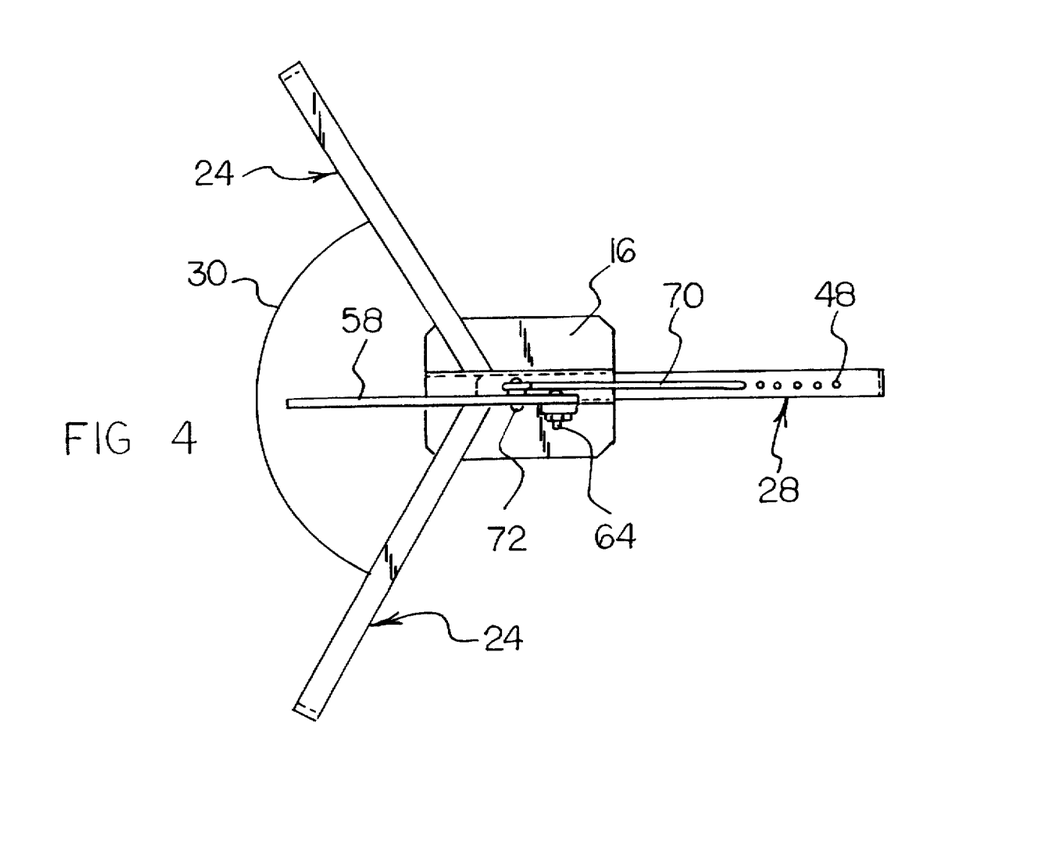
FIG. 4 is an enlarged side view of the embodiment of the invention shown in FIG. 3.
Figure 5:
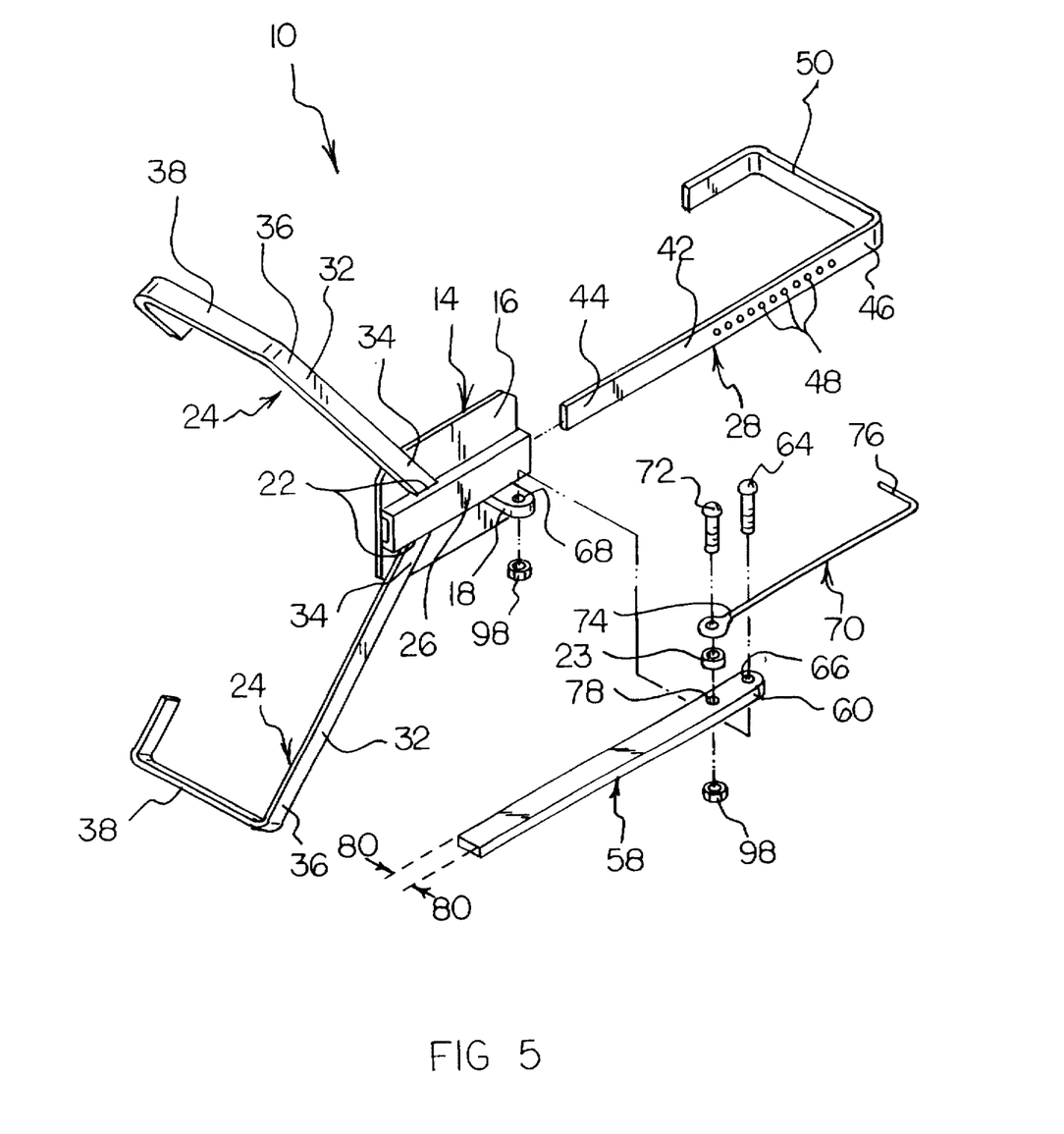
FIG. 5 is an exploded perspective view of the embodiment of the invention shown in FIG. 4.
Figure 6:
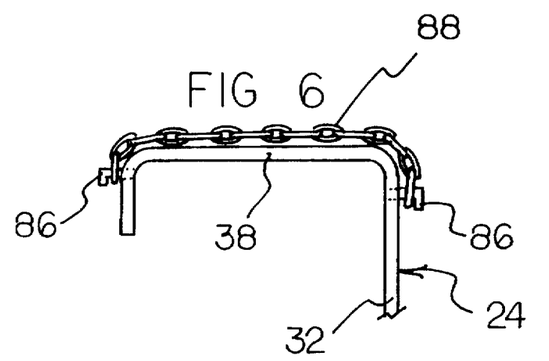
FIG. 6 is a front view of a variation of the invention in which the tire-tread-contacting portion of the invention optionally has a short chain connected to the outside surface of the tire-tread-contacting portion.
Figure 7:
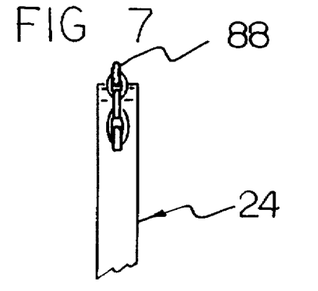
FIG. 7 is a front view of the embodiment of the invention shown in FIG. 6.

With reference to FIGS. 6 and 7, locking studs 86 are connected to the first tire-gripper assemblies 24 and the second tire-gripper assembly 28. The locking studs 86 are position on the first tire-gripper assemblies 24 and the second tire-gripper assembly 28 such that the locking studs 86 are on opposite sides of the tire 12, and chain segments 88 is connected between the locking studs 86 on the respective tire-gripper assemblies, such that the chain segments 88 straddle the first tread-gripper portions 38 and the second tread-gripper portion 50, respectively. Specifically, the tread-gripper portion 38 each comprise a straight and flat portion (not labeled) which is positioned to extend completely across the tread surface of a vehicle tire 12 such that an outer exterior surface of the straight and flat portion faces away from the tread surface of the vehicle tire, as shown in FIG. 1. Each one of the chain segments 88 is connected to an individual one of the tread-gripper portions 38 so as to extend longitudinally along an entire length of the straight and flat portion and along the outer exterior surface thereof.

Figure 8:
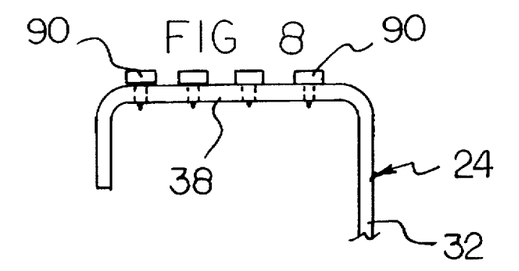
FIG. 8 is a front view of a variation of the invention in which the tire-tread-contacting portion of the invention optionally has studs connected to the outside surface of the tire-tread-contacting portion.
Figure 9:
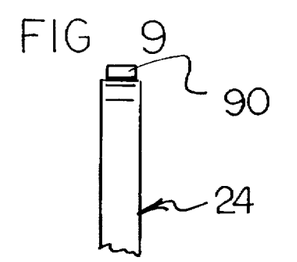
FIG. 9 is a front view of the embodiment of the invention shown in FIG. 8.

With reference to FIGS. 8 and 9, a plurality of stud assemblies 90 are connected to the first tread-gripper portion 38 and the second tread-gripper portion 50. As shown in FIG. 8, the stud assemblies 90 each include a mounting post (not labeled) which projects through the tread-gripper portions. As also shown in FIG. 8, the mounting posts each include a pointed tip (not labeled) projecting beyond an interior surface of the tread-gripper portion for engagement with a tire when the invention 10 is in use.

Figure 10:
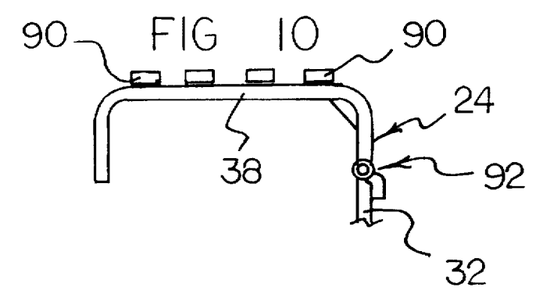
FIG. 10 is a front view of a variation of the invention in which the tire-tread-contacting portion of the invention is optionally hinged.
Figure 11:
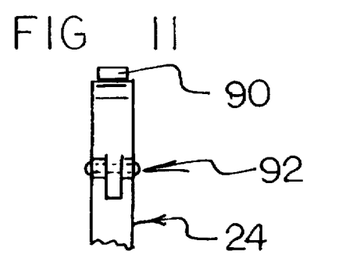
FIG. 11 is a front view of the embodiment of the invention shown in FIG. 10.

With reference to FIGS. 10 and 11, the first tire-gripper assemblies 24 and the second tire-gripper assembly 28 includes hinge assemblies 92 located between the first tread-gripper portions 38 and the extension portions 32 of the first tire-gripper assemblies 24 and between the second tread-gripper portion 50 and the adjustable extension portion 42 of the second tire-gripper assembly 28, respectively.

Figure 12:
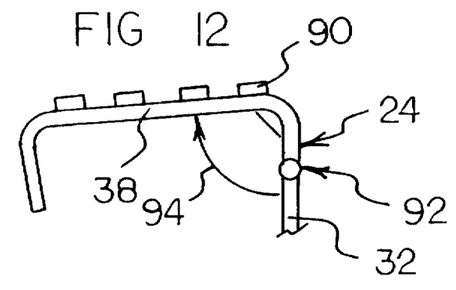
FIG. 12 is a front view of a variation of the invention in which the tire-tread-contacting portion of the invention is optionally oriented at a nonperpendicular angle with respect to its support structure.
Figure 13:
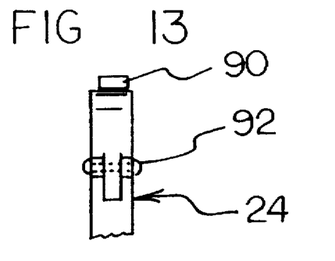
FIG. 13 is a front view of the embodiment of the invention shown in FIG. 12.

With reference to FIGS. 12 and 13, acute angle bends 94 are provided between the first tread-gripper portions 38 and the extension portions 32 of the first tire-gripper assemblies 24 and between the second tread-gripper portion 50 and the adjustable extension portion 42 of the second tire-gripper assembly 28, respectively. More specifically and as shown in FIGS. 10 through 13, the first tread-gripper portions 38 and the second tread-gripper portion 50 each include a lateral arm portion (not labeled) projecting therefrom. The lateral arm portions each project from a plane containing the respective tread-gripper portions 38 and 50. The hinge assemblies 92 are located between the lateral arm portions and the extension portions 32 of the first tire-gripper assemblies 24 and between the lateral arm portions and the adjustable extension portion 42 of the second tire-gripper assembly 28, respectively. By this structure, the lateral portions can be pivoted so as to reside within a plane containing the extension portions 32 and 42 of the tire-gripper assemblies 24 and 28.

The components of the tire traction improvement apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tire traction improvement apparatus that is low in cost, relatively simple in design and operation, and which may advantageously be used without requiring the use of tire chains. With the invention, a tire traction improvement apparatus is provided which does not employ circular support structures placed on each side of a tire. With the invention, a tire traction improvement apparatus is provided which does not require moving a vehicle during the installation procedure. With the invention, a tire traction improvement apparatus is provided which has a mechanism for assuring a tight fit of the device on the tire. With the invention, a tire traction improvement apparatus is provided which has a mechanism for maintaining the device on the tire with a tight fit. With the invention, a tire traction improvement apparatus is provided which includes a mechanism for varying the degree of tightness of fit of the device on a tire. With the invention, a tire traction improvement apparatus is provided which is easily removed from a tire and that optionally includes studs. With the invention, a tire traction improvement apparatus is provided which is adjustable for a range of tire diameters.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A tire traction apparatus for installation on a wheel-mounted vehicle tire, comprising:

a base assembly including a base plate;

a pair of first tire-gripper assemblies fixedly secured to said base assembly and oriented with respect to each other on said base assembly at a predetermined and fixed orientation angle, each of said first tire-gripper assemblies including an extension portion which has a proximal end and a distal end, said proximal end being connected to said base assembly, with said extension portion extending radially from said base assembly, each of said first tire-gripper assemblies including a first tread-gripper portion connected to said distal end of said extension portion;

a second tire-gripper assembly including an adjustable extension portion having a proximal end and a distal end, said adjustable extension portion including a plurality of apertures arrayed between said proximal end and said distal end, said second tire-gripper assembly including a second tread-gripper portion connected to said distal end of said adjustable extension portion;

a channel fixedly secured to said base plate, said proximal end of said adjustable extension portion being slidably received within said channel, said channel supporting said second tire-gripper assembly at the predetermined and fixed orientation angle relative to said first tire-gripper assemblies;

a tensioning assembly mounted to said base assembly for engaging any one of said apertures and pulling said second tread-gripper portion of said second tire-gripper assembly toward said base plate, whereby said pair of first tread-gripper portions of said first tire-gripper assemblies and said second tread-gripper portion of said second tire-gripper assembly exert a clamping pressure on a tread surface of the tire;

hinge assemblies located between said first tread-gripper portions and said extension portions of said first tire-gripper assemblies and between said second tread-gripper portion and said adjustable extension portion of said second tire-gripper assembly;

wherein the first tread-gripper portions and the second tread-gripper portion each include a lateral arm portion projecting therefrom, the lateral arm portions each projecting from a plane containing the respective tread-gripper portion, the hinge assemblies being located between the lateral arm portions and the extension portions of the first tire-gripper assemblies and between the lateral arm portion and the adjustable extension portion of the second tire-gripper assembly, respectively, such that said lateral arm portions can be pivoted to reside within a plane containing the extension portions of the tire-gripper assemblies;

wherein said hinge assemblies allow each of said tire-gripper assemblies to pivot about an axis residing within a plane containing the respective extension portions of the tire-gripper assemblies;

wherein the tread-gripper portions each comprise a straight and flat portion which is positioned to extend completely across the tread surface of the vehicle tire such that an outer exterior surface of the straight and flat member faces away from the tread surface of the vehicle tire; and, a plurality of chain segments, each chain segment being connected to an individual one of the tread-gripper portions so as to extend longitudinally along an entire length of the straight and flat portion and along the outer exterior surface thereof.

2. The apparatus of claim 1 wherein said tensioning assembly includes:

a handle which includes a proximal end and a distal end, wherein said distal end of said handle is pivotally connected to said base plate;

a tensioning arm which includes a proximal end and a distal end, said proximal end of said tensioning arm being pivotally connected to said handle, said distal end of said tensioning arm being positioned in engagement with one of said adjustment apertures on said adjustable extension portion of said second tire-gripper assembly.

* * * * *